United States Patent [19]

Levendusky et al.

[11] Patent Number: 4,558,198
[45] Date of Patent: Dec. 10, 1985

[54] METAL CONTAINER SYSTEM FOR USE IN MICROWAVE OVENS

[75] Inventors: Thomas L. Levendusky, Greensburg; Arthur Benson, Plum Borough, both of Pa.

[73] Assignee: Aluminum Company of America, Pittsburgh, Pa.

[21] Appl. No.: 677,590

[22] Filed: Dec. 3, 1984

[51] Int. Cl.[4] ............................................. H05B 6/80
[52] U.S. Cl. ..................... 219/10.55 E; 219/10.55 F; 126/390; 99/DIG. 14; 426/243; 220/DIG. 27
[58] Field of Search ................. 219/10.55 E, 10.55 F, 219/10.55 R, 10.55 M, 10.55 D; 126/390; 99/DIG. 14, 451; 426/243, 241, 234, 107; 220/DIG. 27, 366

[56]  References Cited

U.S. PATENT DOCUMENTS

| | | | |
|---|---|---|---|
| 1,843,918 | 2/1932 | Cornell | 220/366 |
| 2,622,187 | 12/1952 | Welch | 219/10.55 E |
| 3,420,397 | 1/1969 | Miller | 220/366 |
| 3,854,021 | 12/1974 | Moore et al. | 219/10.55 E X |
| 4,258,630 | 3/1981 | Jorgensen et al. | 219/10.55 F |
| 4,345,133 | 8/1982 | Cherney et al. | 99/451 X |
| 4,413,167 | 11/1983 | Martel et al. | 99/451 X |
| 4,453,064 | 6/1984 | Toyoda et al. | 219/10.55 F |
| 4,481,392 | 11/1984 | Nibbe et al. | 219/10.55 E |

Primary Examiner—Philip H. Leung
Attorney, Agent, or Firm—Elroy Strickland

[57]  ABSTRACT

A metal container and system for arc-free use and minimal electromagnetic reflection in a microwave oven. The container has smooth wrinkle-free side and bottom walls and edges, with the side wall in elevation having a curved configuration provided with a generous radius. The configuration of the container in plan view is either round (circular) or has rounded corners formed with generous radii. The surfaces of the walls and edges are coated on both sides with a layer of heat-resistant plastic material having a thickness on the order of 0.25 to 2.5 mils. A heat-resistant plastic rigid microwave transparent lid is provided for the container, the lid having edge portions that cover the edges of the container when the lid is placed thereon. Such edge portions electrically insulate the metal container from the walls of a microwave oven while the lid itself serves to reduce the escape of heat and moisture from the container.

7 Claims, 4 Drawing Figures

METAL CONTAINER SYSTEM FOR USE IN MICROWAVE OVENS

BACKGROUND OF THE INVENTION

The present invention relates generally to metal containers that can be used in both microwave and conventional ovens. The invention, in addition, is directed to a construction and system that permit the use of metal containers in microwave ovens; the uses are arc-free and non-reflecting of electromagnetic energy.

It has been the general belief that metal containers should not be used to heat and cook food in microwave ovens. Bare metal containers can reflect the electromagnetic energy toward the magnetron (that supplies the energy to the oven cavity) and thereby damage the same. In addition, when bare metal is disposed in close proximity to the metal walls of a microwave oven, arcing between the container and oven walls occurs. For these reasons, the industry has generally advocated the use of plastic or cardboard containers to heat loads, e.g. foods, in microwave ovens.

However, certain exceptions to this prohibition have occurred where it has been desired, for example, to shield one food portion from another in a container to effect differential heating and cooking. This has been effected by the use of metal containers having deep and shallow portions and/or metal strips, often in combination with ferrite materials. Ferrite materials absorb the microwave energy and thereby heat the metal such that cooking or heating of the food is effected at least in part by the use of direct convection heating. There is a large number of U.S. patents which disclose such use of ferrite materials. To list the patents here would be unduly cumbersome and somewhat unnecessary since the present disclosure is not concerned with the use of ferrite materials.

BRIEF SUMMARY OF THE INVENTION

The present invention is directed to the discovery that a metal tray can be used in microwave ovens without electrical arcing and reflection of microwave energy if the following four structures are employed in combination. The four structures are: (1) coating all surfaces of the tray with an FDA-approved organic coating at a very high film weight, i.e., on the order of 1.5-15 milligrams per square inch; (2) smooth curved wrinkle-free walls; (3) a round or oval shape in plan view such that there are no corners of the tray that are not curved or rounded with generous radii; and (4) a heat-resistant plastic, microwave-transparent dome or lid that covers the edges of the tray such that the edges are always physically separated and electrically insulated from the metal walls of the microwave oven. Such a metal tray and combination are also usable in conventional convection ovens, as the lid and the organic coatings on the metal structure are heat-resistant materials.

DESCRIPTION OF THE DRAWINGS

The invention, along with its objectives and advantages, will be better understood from consideration of the following detailed description and the accompanying drawings in which.

PREFERRED EMBODIMENTS

Figure 1:
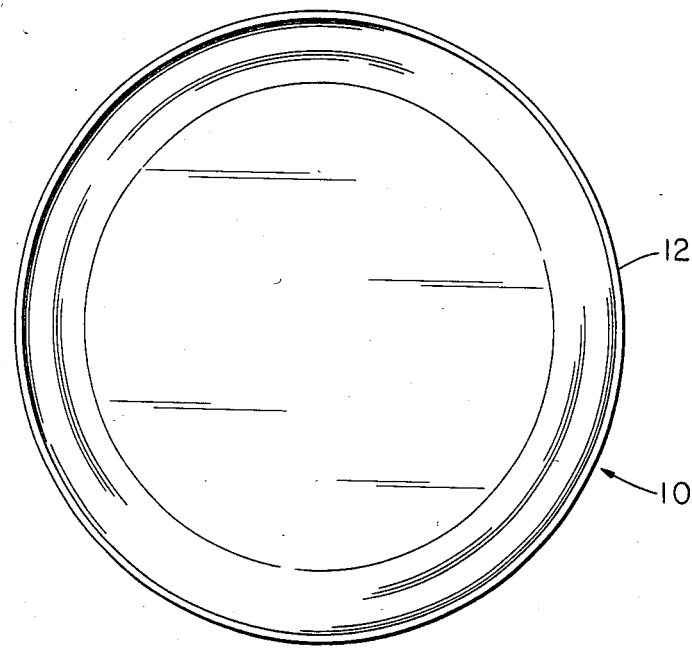
FIG. 1 is a plan view of a circular, shallow tray made in accordance with the principles of the present invention.

Referring now to the drawings, FIG. 1 thereof shows in plan view a circular metal tray 10 for holding food to be cooked or heated in a microwave oven (not shown). The tray has no sharp corners in plan view that might provide a location for the concentration of electromagnetic energy in a microwave oven. Such a concentration of energy promotes arcing between a metal container and an adjacent metal wall of the oven.

As indicated further in FIG. 1, tray 10 is provided with a smooth wrinkle-free peripheral bead 12. In viewing the tray and bead in FIG. 2, the bead is round and smooth in elevation, and the side wall 14 of the tray is smooth and curved in elevation, the radius of the curve of the wall being substantial. A radius of 0.87 inch, for example, has been found suitable for the purposes of the invention. A typical outside diameter for the tray of FIGS. 1 and 2 is 8.25 inches, though other sizes can be used without departing from the scope and spirit of the invention.

Figure 3:
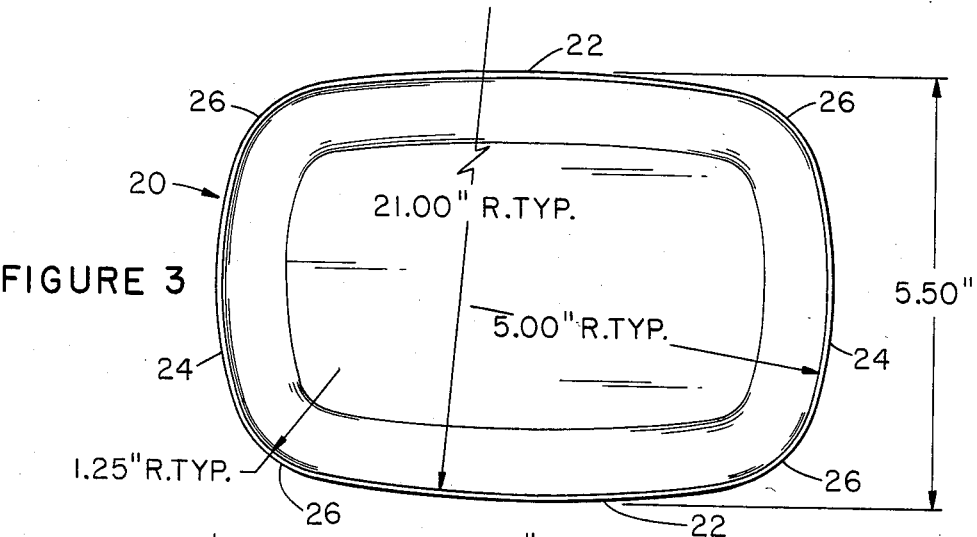
FIG. 3 is a somewhat oval-shaped tray made in accordance with the principles of the invention.

In FIG. 3 of the drawings, an oblong and somewhat oval-shaped tray 20 is shown in which curved side and end walls 22 and 24 thereof, and the corners 26, in plan view, are all formed with generous radii. A typical radius for side walls 22, for example, can be twenty-one inches, as shown, while the radius of end walls 24 is shown as being five inches. A typical radius for the four corners in plan view is 1.25 inches.

A tray size, with the above particulars, that has provided arc-resistant use and reduced reflection of microwave energy in domestic microwave ovens, when coated as described below, has been 5.5 by 8.25 inches (outside dimensions). Such a tray, as depicted in FIG. 4, has the bead and depth dimensions of the tray of FIG. 2, as well as the 0.87 radius for the corner of the container in elevation.

Figure 2:
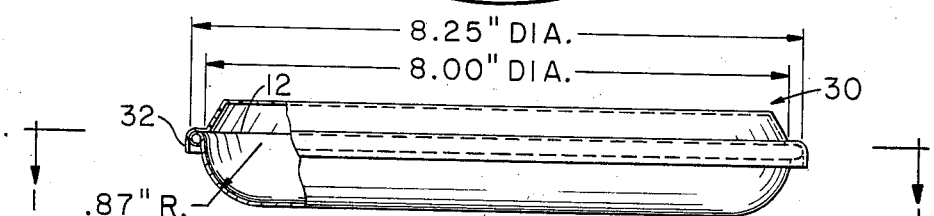
FIG. 2 is a side elevation view of the tray of FIG. 1.
Figure 4:
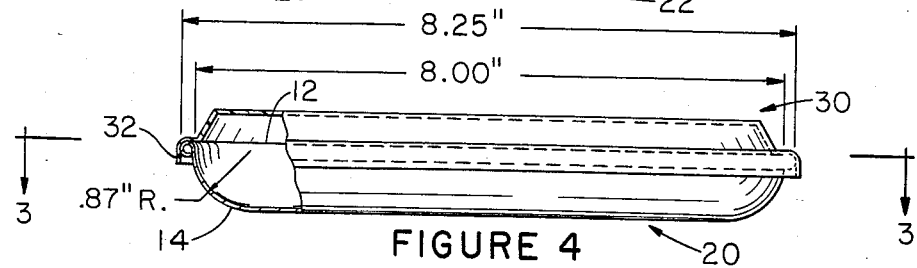
FIG. 4 is a side elevation view of the tray of FIG. 3, with a lid shown disposed on the tray.

Further, as shown in FIGS. 2 and 4 of the drawings, the depth of the trays is relatively shallow, i.e., in the range of about 13 to 33 millimeters. A shallow structure offers less side wall to reflect microwave energy such that the energy is more readily received in the load to be heated and cooked. This, in turn, provides more even distribution of heat within the container and hence more uniform heating and cooking.

The inside and outside surfaces of trays 10 and 20, including beads 12, are coated with plastic materials that diffuse the electromagnetic energy that is directed into the cavity of a microwave oven by its magnetron. By such diffusion, reflection of microwave energy is substantially reduced, if not eliminated altogether. The magnetron of the oven thereby is protected from energy being directed back to itself, and standing wave patterns of the energy within the cooking cavity remain substantially undisturbed. In this manner, the heating-cooking phenomenon effected by the energy within the cavity remains undisturbed for proper functioning of the oven.

The plastic coatings are also heat-resistant such that they can be used in temperature environments as high as 450° F. (232° C.). Preferably, the inside surfaces of tray 10 are coated with a layer of vinyl material, the thickness of the layer being in the range of 0.15 to 5.0 mils. Such a material is approved by the FDA for use in food containers and is available from such companies as Valspar Chemical Company of Pittsburgh, Pa.

The outside surfaces of the trays 10 and 20 are coated with a layer of epoxy material, the thickness of the layer being in the range of 0.15 to 5.0 mils. Like the above vinyl, such epoxy materials are FDA-approved and are available from Valspar Chemical Company.

A diameter for coated beads 12 of the trays that has been found suitable for use in microwave ovens is about 0.125 inch, keeping in mind that too small a bead creates a metal point that may establish conditions for arcing, along with possible fracturing of the organic coating, while too large a bead is wasteful of metal and may make the tray bulky and cumbersome to handle.

If trays 10 and 20 are formed from sheet material that is coated with the above two plastic materials before the tray is formed, bead 12 will have on its outside surface a coating of the above vinyl material; the surface of the bead that is rolled under and toward the main body of the tray will have the epoxy coating. However, trays 10 and 20 can, of course, be coated after they are formed such that at least the outside surface of the bead will be provided with a suitable plastic coating.

To further prevent the occurrence of arcing between the tray and oven walls, the system of the invention includes an electrically insulating dome or lid 30 (FIGS. 2 and 4) having a lower edge or skirt 32 which seats on bead 12 and extends downwardly therefrom. In this manner, the entire periphery of the bead is covered by edge 32. Extension 32 serves to maintain physical, and thus electrical, separation of the metal tray from the metal walls of a microwave oven when the tray, with lid disposed thereon, is placed in the oven.

As shown in FIGS. 2 and 4, lid 30 is preferably relatively shallow, i.e., on the order of ⅜ to ⅝ inch deep in measuring from the upper edge of the container to the inner surface of the lid.

The material of the lid is a heat-resistant microwave transparent plastic, such as a high density polyethylene or polypropylene. Such materials, in addition, are resistant to physical distortion at elevated temperatures.

Further, lid 30 serves to maintain moisture and heat in the load (e.g. food) in the tray, with additional heating action resulting from steam trapped in the tray by the lid.

Preferably, the trays and lid of the invention are structures that are reusable and rigid such that they can be handled without bending and distorting. If the metal of the trays is aluminum, an alloy-gage combination that has been found to provide a relatively rigid structure uses the 3XXX series alloy and a gage of 0.10 to 0.21 millimeters. Other design parameters, however, can be employed to provide a reusable, rigid tray without departing from the spirit and scope of the invention.

Since the coating materials employed in the system of the invention are heat-resistant plastics and the substrate is metal, the system can also be employed in conventional ovens to heat and cook foods.

While the invention has been described in terms of preferred embodiments, the claims appended hereto are intended to encompass all embodiments which fall within the spirit of the invention.

What is claimed is:

1. In combination, a metal container for use in microwave and convection ovens, wherein the microwave oven is supplied with microwave energy by a magnetron, the container having:

substantially smooth wrinkle-free side and bottom walls and edges, with the side wall in elevation being provided with a curved configuration of substantial radius, the configuration of the receptacle in plan view being either round or having rounded corners with substantial radii, the substantial radii of the side wall and corners preventing or at least substantially redcuing the concentration of electromagnetic energy in a microwave environment, with the height of the container being 33 millimeters or less, the surfaces of said walls and edges being coated on both sides with a layer of heat-resistant, electrically insulating plastic material of a thickness on the order of 0.25 to 2.5 mils, said plastic material being effective to diffuse and thereby prevent substantial reflection of microwave energy toward the magnetron of the microwave oven, and a heat-resistant, electricaly insulating plastic rigid microwave transparent lid for said container, said lid having edge portions that extend over and beside the edges of the container when the lid is placed thereon, and thus insulate said edges elextrically from the walls of an oven.

2. The combination of claim 1 in which the plastic coating on the inside surfaces of the container is a vinyl material.

3. The combination of claim 1 in which the plastic coating on the outside surfaces of the container is an epoxy material.

4. The combination of claim 1 in which the edges of the container are provided with a rolled bead.

5. The combination of claim 1 in which the gage and/or alloy of the metal of the container is sufficient to provide a relatively rigid structure.

6. The combination of claim 1 in which the structure of the container is such that it is reusable.

7. A process of providing a metal container and combination usable in a microwave oven supplied with microwave energy by a magnetron without arcing and without substantial reflection of microwave energy, comprising the steps of:

forming a shallow container in a manner that provides the same with (1) curved smooth substantially wrinkle-free side and bottom walls and edge, (2) a depth in the range of 13 to 33 millimeters and (3) curves of the walls and edge in plan and elevation views with substantial radii, coating all surfaces of said walls and edges with a layer of heat-resistant plastic material of a thickness on the order of 0.25 to 2.5 mils, said plastic material being effective to diffuse and thereby prevent substantial reflection of microwave energy toward the magnetron of the oven, and providing a microwave transparent lid for the container that has an edge portion that extends over and beside the edge of the container when the lid is placed on the container, the material of the lid being a heat-resistant, electrically insulating plastic material.

* * * * *